US012310393B2

(12) United States Patent
Mazoyer et al.

(10) Patent No.: US 12,310,393 B2
(45) Date of Patent: *May 27, 2025

(54) CITRUS FIBERS WITH OPTIMIZED WATER BINDING CHARACTERISTICS

(71) Applicant: Cargill, Incorporated, Wayzata, MN (US)

(72) Inventors: Jacques André Mazoyer, Donville-les-Bains (FR); Joel Rene Pierre Wallecan, Ternat (BE)

(73) Assignee: Cargill, Incorporated, Wayzata, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,586

(22) Filed: Oct. 6, 2023

(65) Prior Publication Data
US 2024/0041085 A1  Feb. 8, 2024

Related U.S. Application Data

(62) Division of application No. 15/748,817, filed as application No. PCT/US2016/044623 on Jul. 29, 2016, now Pat. No. 11,812,775.

(30) Foreign Application Priority Data

Jul. 31, 2023  (EP) .................................... 15179315

(51) Int. Cl.
*A23L 33/22*   (2016.01)
*A23D 7/005*   (2006.01)
*A23D 9/007*   (2006.01)
*A23K 10/37*   (2016.01)
*A23K 20/10*   (2016.01)
*A23K 20/163*  (2016.01)
*A23L 2/52*    (2006.01)

(52) U.S. Cl.
CPC ............ *A23L 33/22* (2016.08); *A23D 7/0053* (2013.01); *A23D 7/0056* (2013.01); *A23D 9/007* (2013.01); *A23K 10/37* (2016.05); *A23K 20/10* (2016.05); *A23K 20/163* (2016.05); *A23L 2/52* (2013.01); *A23V 2002/00* (2013.01)

(58) Field of Classification Search
CPC ........... A23L 2/52; A23L 33/22; A23K 20/10; A23K 10/37; A23K 20/163; A23D 9/007; A23D 7/0053; A23D 7/0056; A23V 2002/00
USPC ......................................................... 426/573
See application file for complete search history.

(56) References Cited

U.S. PATENT DOCUMENTS 4,865,863  A   9/1989  Prosise
5,964,983  A   10/1999 Dinand 6,306,207  B2  10/2001 Cantiani
6,485,767  B1  11/2002 Cantiani

FOREIGN PATENT DOCUMENTS

| CN | 101797037 A | 8/2010 |
|---|---|---|
| EP | 1517931 B1 | 4/2011 |
| EP | 2336286 A1 | 6/2011 |
| EP | 2597968 B1 | 8/2018 |
| EP | 3328209 B1 | 3/2020 |
| WO | 0117376 W | 3/2001 |
| WO | 2006033697 W | 3/2006 |
| WO | 2012000609 W | 1/2012 |
| WO | 2012016190 A1 | 2/2012 |
| WO | 2012016201 A2 | 2/2012 |
| WO | 2012112700 W | 8/2012 |
| WO | 2013109721 A2 | 7/2013 |
| WO | 2017019752 W | 2/2017 |
| WO | 2017023722 A1 | 2/2017 |

OTHER PUBLICATIONS

Agoda-Tandjawa Guéba; Mazoyer Jacques; Wallecan Joël; Langendorff Virginie, "Effects of sucrose addition on the rheological properties of citrus peel fiber suspensions before and after drying", Food Hydrocolloids, Elsevier BV, NL, NL, (Oct. 31, 2019), vol. 101, doi:10.1016j.foodhyd.2019.105473, ISSN 0268-005X.
Bampidis Va et al., "Citrus by-products as ruminant feeds", Animal Feed Science and Technology, (20060000), vol. 128, doi:10.1016/j.anifeedsci.2005.12.002, pp. 175-217.
CV of Prof. Hans-Ulrich EndreB.
Debon et al. (2012) Applied Rheology, 22: (6): 63919-63930 (Year: 2012).
Determination of Swelling volume for citrus fiber suspensions.
Document D29 of Opposition Case against EP 2 597968 B1, filed by Cargill as Patent Proprietor on Oct. 10, 2019.
Essmat et al., 2017: "Functional Properties of Citrus Peel as Affected by Drying Methods" Am. J. Food Technol., 12:193-200.
Irkin, Et Al., "Phenolic content, antioxidant activities and stimulatory roles of citrus fruits on some lactic acid bacteria", Arch. Biol. Sci. Belgrade, (Jan. 1, 2015), vol. 67, No. 4.
Johansson, Et Al., "Experimental evidence on medium driven cellulose surface adaption demonstrated using nanofibrillated cellulose", Soft Matter, (Jan. 1, 2011), vol. 7.
Lab protocol 066/2020-W, Dec. 11, 2020 "Assessment for alcohol precipitation of citrus fibers".
Lab report 041 /4022 "Precipitation of homogenized fiber slurry with 4%DS".

(Continued)

Primary Examiner — Subbalakshmi Prakash

(57) ABSTRACT

The invention relates to citrus fibers in dry form having a water holding capacity (WHC) of at least 35 mL of water per gram of anhydrous (0% moisture) fibers. Said fibers also have a swelling factor (SV), wherein when applying a gravitational force (G-force) on an aqueous medium containing 1 wt % of said fibers dispersed therein, the WHC varies with the G-force according to Formula (1) wherein DF is a decay factor of at least 500.

$$WHC \geq SV - e^{\frac{1}{DF \cdot G-force}} \quad (1)$$

20 Claims, No Drawings

(56) References Cited

OTHER PUBLICATIONS

Lab report 042/2022"Precipitation of homogenized fiber slurry with 2%DS".

Migwi, P.K. et al., « The nutritive value of citrus pulp ensiled with wheat straw and poultry litter for sheep, Australian Journal of Experimental Agriculture, 2001.

Outgoing control schedule for Herbacel AQ Plus Citrus-N dated Mar. 3, 2015.

Table of pH values of Common Foods and Ingredients (from Food Eng. 34(3): 98-99).

Van Buggenhout et al. Innovative Food Science and Emerging Technologies 30 (2015) 51-60 (Year: 2015).

CITRUS FIBERS WITH OPTIMIZED WATER BINDING CHARACTERISTICS

CROSS REFERENCE TO RELATED APPLICATIONS

This application is a Divisional U.S. patent application Ser. No. 15/748,817, filed 30 Jan. 2018, which is a national phase application of PCT/US2016/044623, filed 29 Jul. 2016, entitled CITRUS FIBERS WITH OPTIMIZED WATER BINDING CHARACTERISTICS, which claims the benefit of priority to European Application No. 15179315.5, filed 31 Jul. 2015, entitled CITRUS FIBERS WITH OPTIMIZED WATER BINDING CHARACTERISTICS, which are is hereby incorporated by reference in their its entirety.

The present invention relates to dry citrus fibers having optimized water binding characteristics and a method for manufacturing thereof. The invention further relates to various products containing said fibers.

BACKGROUND

Citrus fibers are known to have many interesting properties making them suitable for use in a variety of products for human and animal consumption. Citrus fibers have been successfully employed, mainly as texturizing additives, in food and feed products and beverages, but also in personal care, pharmaceutical and detergent products. For the manufacturing of any of the above products, citrus fibers may be used in dry form (dry citrus fibers) or they may be dispersed in an aqueous medium. In particular the use of dry citrus fibers is advantageous due to the fibers' longer shelf life and reduced costs of shipping from a fiber production plant or storage site to a processing facility.

Dry citrus fibers and compositions containing thereof are for example known from WO 2006/033697, WO 2012/016190, and WO 2013/109721. When carefully dried, these known citrus fibers may retain an optimum free surface area available for binding water upon rehydration and dispersion, which in turn provides said fibers with thickening capabilities, good stability, and the capacity to create optimum textures. Using various techniques such as the one disclosed in WO 2012/016201, the properties of the dry citrus fibers can be further tailored to provide optimum functionalities.

Often, the ability of citrus fibers to bind and stabilize the water is considered essential for products containing a dispersion of said fibers in an aqueous medium or for those prepared from such dispersions. This ability is particularly important during products' transportation, when the products may be subjected to shocks and high gravity forces (G-forces) which in turn may cause the water to separate from the remaining components or ooze out therefrom. Such water separation may deleteriously influence the texture, rheology and visual appearance of the products and is hence highly undesired.

However, preparing citrus fibers and in particular dry citrus fibers without affecting their water binding characteristics such as water holding capacity and swelling volume, is difficult. It is known that the separation of water in products where citrus fibers are used to hold it and stabilize it, increases exponentially with the G-forces acting on said product; in other words, the water binding characteristics of the citrus fibers contained by said product decay exponentially with the G-forces acting on the product. Another important property which may be largely lost during processing is the capacity of the citrus fibers to disperse in an aqueous medium under mild and low shearing conditions. A method of providing dry fibers which are dispersible in an aqueous medium is to functionalize or derivatize the fibers, i.e. grafting various chemical moieties on the surface of the fibers. U.S. Pat. No. 5,964,983 discloses dry fibers, e.g. citrus fibers, functionalized with acidic polysaccharides retained on their surface. These fibers however, can only be dispersed in water with a high-shear mixing device of the ULTRA TURRAX type and cannot be thus considered readily dispersible.

Another method known to provide dry, dispersible fibers, involves drying the fibers in the presence of additives. U.S. Pat. Nos. 6,485,767 and 6,306,207 disclose dry compositions containing up to 20 wt % of a polyhydroxylated compound and dry fibers. Although citrus fibers were mentioned as being a suitable example, no experimental data using such fibers was reported therein.

It was also observed that known dry citrus fibers containing or free of additives may have undesirable characteristics such as stickiness, which in turn may cause problems during a subsequent processing thereof. Also, their water binding characteristics are less than optimum with a stronger decay of their water holding capacity with G-forces. Also, their water holding capacity at a certain G-force as well as their swelling volumes and G' values are reduced while their viscosity profiles is less than optimum.

Accordingly, there is an unmet need in the industry for dry citrus fibers, which have optimum water binding characteristics. In particular there is a need for such fibers having a reduced decay of their water binding characteristics when the G-forces acting thereupon are increasing. It is also preferred that such fibers can be readily dispersed in an aqueous medium. More in particular there is a need for such fibers having optimized water holding capacities and/or swelling volumes and which preferably upon dispersion in an aqueous medium provide said medium with an optimum rheological behavior. More in particular, there is a need for dry citrus fibers which when dispersed in an aqueous medium, show an optimized water holding capacity and/or swelling volume and provide the aqueous medium with optimum G' values and/or an optimum viscoelastic stability.

SUMMARY OF INVENTION

A primary object of this invention may thus be to provide dry citrus fibers having an optimized decay of their water binding characteristics with the G-forces acting thereupon. Preferably, said fibers are readily dispersed in an aqueous medium under low-shear stirring to form a dispersion having optimum rheological properties.

The foregoing and other objects of this invention are met by providing dry citrus fibers having a water holding capacity (WHC) of preferably at least 35 mL of water per gram of anhydrous (0% moisture) fibers. Said fiber preferably have a swelling factor (SV), wherein when applying a gravitational force (G-force) on an aqueous medium containing 1 wt % of said fibers dispersed therein, the WHC varies with the G-force according to Formula 1:

$$WHC \geq SV - e^{\frac{1}{DF \cdot G\text{-}force}} \quad \text{Formula 1}$$

wherein DF is a decay factor of at least 500.

In a further aspect, the invention relates to dry citrus fibers having a water holding capacity (WHC) of at least 35 mL of water per gram of anhydrous (about 0% moisture) fibers, the WHC being determined on an aqueous medium containing 1 wt % of said fibers dispersed therein after subjecting said medium to a G-force of 3000 G.

In a further aspect, the invention relates to dry citrus fibers having a water holding capacity (WHC) of at least 35 mL of water per gram of anhydrous (0% moisture) fibers, the WHC being determined on an aqueous medium containing 1 wt % of said fibers dispersed therein after subjecting said medium to a G-force of 3000 G, and wherein said fibers have a storage modulus (G') of at least 400 Pa when measured on an aqueous medium containing an amount of 2 wt % citrus fibers dispersed therein under a low-shear stirring of less than 10000 rpm.

DETAILED DESCRIPTION

Any feature of a particular embodiment of the present invention may be utilized in any other embodiment of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Except in the examples and comparative experiments, or where otherwise explicitly indicated, all numbers in this description indicating amounts of material or conditions of reaction, physical properties of materials and/or use are to be understood as modified by the word "about". Unless specified otherwise, numerical ranges expressed in the format "from x to y" are understood to include x and y. When for a specific feature multiple preferred ranges are described in the format "from x to y", it is understood that all ranges combining the different endpoints are also contemplated. For the purpose of the invention ambient (or room) temperature is defined as a temperature of about 20 degrees Celsius The ability of citrus fibers to bind and hold water is arguably one of the most important quality characteristics thereof. The release of water under normal and high-G conditions from products containing citrus fibers is an undesirable phenomenon and may deleteriously impact at least the product's texture, rheology and aspect. The present invention provides citrus fibers which have water binding characteristics never achieved hitherto. The inventors observed that the citrus fibers of the invention (hereinafter "inventive fibers") have an optimum ability to bind and hold water even under increased G-forces. When used in the manufacturing of products where water stabilization is desired, the inventive fibers showed optimum water binding characteristics which decay with the G-forces less than in the case of known fibers. The inventive fibers may be thus providing the product with an optimum texture and rheology.

The invention provides dry citrus fibers having a water holding capacity (WHC) and a swelling factor (SV), wherein when applying a gravitational force (G-force) on an aqueous medium containing 1 wt % of said fibers dispersed therein, the WHC varies with the G-force according to Formula 1:

$$WHC \geq SV - e^{\frac{1}{DF \cdot G\text{-}force}}$$ Formula 1 wherein DF is a decay factor of at least 500. With the wording "WHC varies with the G-force" is herein understood that the WHC of the fibers of the invention depends on the applied G-force.

Products containing water may be subjected to various amounts of external stresses, in particular during their handling and transportation. These stresses may cause the various ingredients thereof and also the water contained therein to displace from their location and eventually to be forced out of the product. To understand the influence of the external stresses on the products and find solutions that mitigate the unwanted effects thereof, the inventors replicated the external stresses in the laboratory by means of application of a range of G-forces on said products. It is known that when applying a G-force on a product containing water, wherein the water was stabilized by various means, e.g. with the help of citrus fibers, above a certain G-force threshold the release of water is accelerated exponentially. Having a higher threshold helps in minimizing the displacement and release of water. The inventors observed that the citrus fibers of the invention (hereinafter "the inventive fibers") have an optimum decay factor (DF) which on one hand may increase the threshold for water release and on the other hand may minimize the amount of water released when strong G-forces (e.g. 1000 G to 4000 G) are applied on the product.

Preferably, DF of the inventive fibers is at least 750, more preferably at least 1000, even more preferably at least 1250, yet even more preferably at least 1500, most preferably at least 1750.

The WHC of the inventive fibers decreases in accordance with Formula 1 when increasing the G-force applied on the aqueous medium containing 1 wt % (relative to the total weight of the medium) of said fibers dispersed therein. Preferably, the G-force is increased between 100 G (i.e. 100 times the standard gravitational force (STG)) and 4000 G, more preferably between 300 G and 3500 G, most preferably between 500 G and 3000 G. The G-force may be applied on the aqueous medium using known means, e.g. by means of centrifugation. Such centrifugation means are described for example in the METHODS OF MEASUREMENT section hereinbelow.

For the purpose of this invention, STG can be calculated according to Formula 2

STG=9.80×weight of object (in Kg)  Formula 2 wherein the "weight of object in Kg" is the weight of the aqueous medium containing the 1 wt % of dispersed inventive fibers. The variations of STG with altitude or other factors are not taken into account.

Preferably, the inventive fibers have a water holding capacity (WHC) of at least 35 mL of water per gram of anhydrous (about 0% moisture) fibers, the WHC being determined on an aqueous medium containing 1 wt % (relative to the total weight of said medium) of said fibers dispersed therein after subjecting said medium to a G-force of 3000 G. Preferably, said WHC is at least 36 milliliters of water (mL) per gram of fibers (g), more preferably at least 38 mL/g, most preferably at least 40 mL/g.

Preferably the inventive fibers have a SV of at least 40%, more preferably at least 45%, most preferably at least 50%, when determined on an aqueous medium containing 0.1 wt % (relative to the total weight of said medium) of said fibers dispersed therein. The protocol for determining the SV at low concentrations of fibers (e.g. about 0.1 wt %) is described in the METHODS OF MEASUREMENT section hereinbelow.

The citrus fibers of the invention are in dry form, which is herein understood as containing an amount of liquid, e.g. water and/or organic solvent, of less than 20 wt % relative to the total weight of the fibers. Preferably said fibers contain an amount of water (i.e. moisture content) relative to the total weight of the fibers of at most 12 wt %, more preferably at most 10 wt %, or most preferably at most 8 wt %. Such dry fibers may be more economical to transport and store while being readily dispersible in the aqueous medium.

The fibers of the invention are citrus fibers. The term "fiber" as used herein, refers to an elongated object comprising microfibrils of cellulose, the fiber having a length (major axis) and a width (minor axis) and having length to width ratio of at least 5, more preferably at least 10, or most preferably at least 15, as observed and measured by a high-resolution scanning electron microscope ("SEM"). The dimensions of the fibers were measured on "wet" fibers, i.e. fibers which were extracted from an aqueous dispersion (e.g. containing 0.1 wt % fibers). The length of the citrus fibers is preferably at least 0.5 µm, more preferably at least 1 µm. The width of the citrus fibers is preferably at most 100 nm, more preferably at most 50 nm, most preferably at most 15 nm.

Citrus fibers are fibers contained by and obtained from the fruits of the citrus family. The citrus family is a large and diverse family of flowering plants. The citrus fruit is considered to be a specialized type of berry, characterized by a leathery peel and a fleshy interior containing multiple sections filled with juice filled sacs. Common varieties of the citrus fruit include oranges, sweet oranges, clementines, kumquats, tangerines, tangelos, satsumas, mandarins, grapefruits, citrons, pomelos, lemons, rough lemons, limes and leech limes. The citrus fruit may be early-season, mid-season or late-season citrus fruit. Citrus fruits also contain pectin, common in fruits, but found in particularly high concentrations in the citrus fruits. Pectin is a gel-forming polysaccharide with a complex structure. It is essentially made of partly methoxylated galacturonic acid, rhamnose with side chains containing arabinose and galactose, which are linked through a glycosidic linkage. The pectin content of the citrus fruit may vary based on season, where ripe fruit may contain less pectin than unripe fruit.

Citrus fiber is to be distinguished from citrus pulp, which are whole juice sacs and are sometimes referred to as citrus vesicles, coarse pulp, floaters, citrus cells, floating pulp, juice sacs, or pulp. Citrus fiber is also to be distinguished from citrus rag, which is a material containing segment membrane and core of the citrus fruit.

The citrus fibers are typically obtained from a source of citrus fibers, e.g. citrus peel, citrus pulp, citrus rag or combinations thereof. Moreover, the citrus fibers may contain the components of the primary cell walls of the citrus fruit such as cellulose, pectin and hemicelluloses and may also contain proteins.

Preferably, the citrus fibers of the invention did not undergo any substantial chemical modification, i.e. said fibers were not subjected to chemical modification processes, such as any of esterification, derivatisation or enzymatic modification and combinations thereof.

Preferably, the citrus fibers in accordance with the invention have a crystallinity of at least 10%, more preferably at least 20%, most preferably at least 30% as measured on a dried (less than 20 wt % water content relative to the content of fibers) sample by X-ray diffraction method (Siegel method). Preferably, the crystallinity of said fibers is between 10% and 60%.

Preferably, the citrus fibers in accordance with the invention have a storage modulus (G') of at least 400 Pa when measured on an aqueous medium containing an amount of 2 wt % citrus fibers dispersed therein under a low-shear stirring of less than 10000 rpm.

The storage modulus G' is commonly used in the food industry to analyze the rheological properties of dispersions and in particular fiber-based dispersions. In the art, by fiber-based dispersion is understood fibers or compositions containing thereof dispersed in an aqueous medium. G' is a measure of a deformation energy stored in the dispersion during the application of shear forces and provides an excellent indication of the dispersion's viscoelastic behavior. G' is measured on an aqueous medium containing an amount of 2 wt % of citrus fibers, i.e. relative to the total weight of the aqueous medium. When fibers are dispersed under low-shear in an aqueous medium, it is highly desirable to achieve dispersions having G' values as high as possible at concentrations of fibers as low as possible.

The present inventors noticed that the citrus fibers of the invention were able to meet the above requirements and hence, in addition to their excellent water binding characteristics, these novel fibers may impart food formulations containing thereof with optimum rheological properties. The novel citrus fibers have also an improved dispersibility in that they are readily dispersible. Moreover, since said citrus fibers may be used at lower concentrations to achieve increased G' values, food manufactures may have increased design freedom for food formulations, in that they may be able to add or remove constituents while maintaining optimum viscoelastic properties thereof.

The G' of the citrus fibers of the invention is preferably at least 550 Pa. More preferably, said G' is at least 650 Pa, even more preferably at least 700 Pa, yet more preferably at least 750 Pa, yet more preferably at least 800 Pa, yet more preferably at least 900 Pa, even more preferably at least 1000 Pa, most preferably at least 1200 Pa.

As used herein, "dispersibility" means the capacity of the dry fibers to largely regain their initial functionality upon dispersion in an aqueous medium, e.g. water, wherein by initial functionality is herein understood the functionality of the fibers before being dehydrated and/or dried. Properties defining the initial functionality may include the fibers' swelling capacity, viscoelasticity, water binding characteristics and stabilization power.

The term "readily dispersible" as used herein means that it is not necessary to use high-shear means, e.g. high-shear mixers or homogenizers, to disperse the fibers in an aqueous medium such as water; but rather that the dispersion of the fibers can be accomplished with low-shear stirring equipment, such as for example, magnetic stirrers or mechanical stirrers, e.g. an IKA® Eurostar mechanical stirrer equipped with an R1342 4-bladed propeller stirrer or a Silverson L4RT overhead batch mixer equipped with an Emulsor Screen (e.g. with round holes of about 1 mm diameter).

The term "aqueous medium" as used herein means a liquid medium which contains water, suitable non-limiting example thereof including pure water, a water solution and a water suspension, but also those liquid mediums contained by dairy products such as milk, yoghurt and the like; personal care products such as lotions, creams, ointments and the like; and pharmaceutical products The inventors surprisingly observed that the citrus fibers of the invention manifest these high G' values upon being dispersed in an aqueous medium under low shear, i.e. stirring with less than 10000 rpm. This is even more surprising since said high G' values were achieved at the low fiber concentrations, e.g. of 2 wt %. The aqueous medium preferably contains water in an amount of at least 75 wt %, more preferably at least 85 wt %, most preferably at least 95 wt %, relative to the total amount of the medium. Preferably, the stirring used to achieve the dispersion of the fibers of the invention in the aqueous medium is at most 8000 rpm, more preferably at most 5000 rpm, most preferably at most 3000 rpm.

Preferably, the citrus fibers of the invention contain an additive which is preferably distributed therebetween. By the term "additive distributed therebetween" is herein understood that said additive is distributed inside a volume defined by the totality of fibers and preferably also between the microfibrils forming the fibers.

The additive is preferably in an amount of at least 5 wt % relative to the weight of the anhydrous citrus fibers, more preferably of at least 10 wt %, even more preferably of at least 20 wt %, yet even more preferably of at least 30 wt %, most preferably of at least 50 wt %. The weight of anhydrous fibers may be determined by drying 10 grams of the fibers without the additive at 105° C. under normal atmosphere until constant weight is obtained. The same determination can be carried out in the presence of the additive; however, in this case the amount of additive in the sample has to be subtracted therefrom. The upper limit for the additive amount can be kept within large variances since it was observed that the citrus fibers of the invention may have the ability to optimally include said additive. A preferred upper limit for the additive amount is at most 1000 wt % relative to the weight of the fibers, more preferably at most 750 wt %, most preferably at most 500 wt %. In a preferred embodiment, the additive is in an amount of between 5 wt % and 95 wt %, more preferably between 10 wt % and 80 wt %, even more preferably between 20 wt % and 75 wt %, most preferably between 30 wt % and 70 wt %. In another preferred embodiment, the additive is in an amount of at least 100 wt %, more preferably at least 200 wt %, most preferably at least 300 wt %.

Preferably, the citrus fibers described in the embodiments of the invention contain an additive in an additive:fiber (A:F) ratio of between 0.1:1.00 and 10.00:1.00 by weight, more preferably between 0.20:1.00 and 9.00:1.00 by weight, most preferably between 0.50:1.00 and 8.00:1.00 by weight. The inventors observed that the inventive fibers have excellent water binding characteristics and stable rheological properties.

The additive used in accordance with the invention is preferably chosen from the group consisting of a sugar, a protein, a polysaccharide, a polyol and combinations thereof. More preferably, said additive is chosen from the group consisting of a sugar, a protein, a polysaccharide, a sugar alcohol and combinations thereof. Examples of sugars may include, without being limited thereto, monosaccharides such as fructose, mannose, galactose, glucose, talose, gulose, allose, altrose, idose, arabinose, xylose, lyxose, sorbose and ribose; and oligosaccharides such as sucrose, maltose, lactose, lactulose, and trehalose. Preferred proteins are those accepted in the food industry, e.g. gelatin, pea protein or pea protein hydrolisates. Preferred polysaccharides are those having a general formula $(C_6H_{10}O_5)_n$ with n being preferably between 2 and 40, more preferably between 2 and 30, most preferably between 2 and 20. Examples of polysaccharides include, without being limited thereto, dextrins such as maltodextrin, cyclodextrin, amylodextrin; and starches. Preferred sugar alcohols are those having the general formula $HOCH_2(CHOH)_mCH_2OH$ with m being preferably between 1 and 22, more preferably between 1 and 10, most preferably between 1 and 4. Examples of sugar alcohols may include, without being limited thereto, glycerol, erythritol, threitol, arabitol, xylitol, ribitol, mannitol, sorbitol, galactitol, fucitol, iditol, inositol, volemitol, isomalt, maltitol, lactitol, maltotriitol, maltotetraitol, polyglycitol and combinations thereof.

In a preferred embodiment, the additive used in accordance with the invention is chosen from the group consisting of a sugar, a dextrin, and a sugar alcohol.

In another preferred embodiment, the additive used in accordance with the invention is a starch. The starch used in this invention may be any starch derived from any native source. A native starch as used herein, is one as it is found in nature. Also suitable are starches derived from a plant obtained by any known breeding techniques. Typical sources for the starches are cereals, tubers and roots, legumes and fruits. The native source can be any variety, including without limitation, corn, potato, sweet potato, barley, wheat, rice, sago, amaranth, tapioca (cassava), arrowroot, canna, pea, banana, oat, rye, triticale, and sorghum, as well as low amylose (waxy) and high amylose varieties thereof. Low amylose or waxy varieties is intended to mean a starch containing at most 10% amylose by weight, preferably at most 5%, more preferably at most 2% and most preferably at most 1% amylose by weight of the starch. High amylose varieties is intended to mean a starch which contains at least 30% amylase, preferably at least 50% amylose, more preferably at least 70% amylose, even more preferably at least 80% amylose, and most preferably at least 90% amylose, all by weight of the starch. The starch may be physically treated by any method known in the art to mechanically alter the starch, such as by shearing or by changing the granular or crystalline nature of the starch, and as used herein is intended to include conversion and pregelatinization. Methods of physical treatment known in the art include ball-milling, homogenization, high shear blending, high shear cooking such as jet cooking or in a homogenizer, drum drying, spray-drying, spray cooking, chilsonation, roll-milling and extrusion, and thermal treatments of low (e.g. at most 2 wt %) and high (above 2 wt %) moisture containing starch. The starch may be also chemically modified by treatment with any reagent or combination of reagents known in the art. Chemical modifications are intended to include crosslinking, acetylation, organic esterification, organic etherification, hydroxyalkylation (including hydroxypropylation and hydroxyethylation), phosphorylation, inorganic esterification, ionic (cationic, anionic, nonionic, and zwitterionic) modification, succination and substituted succination of polysaccharides. Also included are oxidation and bleaching. Such modifications are known in the art, for example in Modified starches: Properties and Uses. Ed. Wurzburg, CRC Press, Inc., Florida (1986).

The invention also relates to dry citrus fibers having a water holding capacity (WHC) of at least 35 mL of water per gram of anhydrous (0% moisture) fibers, the WHC being determined on an aqueous medium containing 1 wt % (relative to the total weight of said medium) of said fibers dispersed therein after subjecting said medium to a G-force of 3000 G, and wherein said fibers have preferably a storage modulus (G') of at least 400 Pa when measured on an aqueous medium containing an amount of 2 wt % citrus fibers dispersed therein under a low-shear stirring of less than 10000 rpm. Preferably said fibers contain an additive. Preferred ranges for WHC and G' as well as preferred examples of the additive are given above and will not be repeated herein. Preferably, said fibers contain an amount of liquid, e.g. water and/or organic solvent, of less than 20 wt % relative to the total weight of the fibers. Preferably said fibers contain an amount of water of at most 12 wt %, more preferably at most 10 wt %, or most preferably at most 8 wt % relative to the total weight of the fibers.

The invention also relates to dry citrus fibers having a water holding capacity (WHC) of at least 35 mL of water per gram of anhydrous (0% moisture) fibers, the WHC being determined on an aqueous medium containing 1 wt % (relative to the total weight of said medium) of said fibers dispersed therein after subjecting said medium to a G-force of 30000. Preferably, said WHC is at least 36 mL of water (mL) per gram of fibers (g), more preferably at least 38 mL/g, most preferably at least 40 mL/g. Preferably, the fibers contain an additive. Preferred examples of the additive are given above and will not be repeated herein. Preferably, said fibers contain an amount of liquid, e.g. water and/or organic solvent, of less than 20 wt % relative to the total weight of the fibers. Preferably said fibers contain an amount of water of at most 12 wt %, more preferably at most 10 wt %, or most preferably at most 8 wt % relative to the total weight of the fibers.

The invention also relates to dry citrus fibers having a water holding capacity (WHC) of at least 35 mL of water per gram of fibers, said fibers containing an additive distributed therebetween. Examples of the additives were given above and will not be repeated herein. Preferably, the WHC is at least 36 mL/g, more preferably at least 38 mL/g, most preferably at least 40 mL/g. Preferably, the inventive fibers have the required and preferred WHC under a gravitational force (G-force) of at least 500 G, more preferably at least 1500 G, most preferably at least 3000 G. Preferably, the dry citrus fibers contain an amount of liquid, e.g. water and/or organic solvent, of less than 20 wt % relative to the total weight of the fibers with the additive. Preferably said fibers contain an amount of water of at most 12 wt %, more preferably at most 10 wt %, or most preferably at most 8 wt % relative to the total weight of the fibers with the additive. Such dry citrus fibers may be more economical to transport and store. Preferably, said fibers have a storage modulus (G') of at least 400 Pa, said G' being measured on an aqueous medium obtained by dispersing an amount of said fibers therein under a low shear stirring of less than 10000 rpm to obtain a citrus fibers' concentration of 2 wt % relative to the total weight of the aqueous medium. Preferably, G' is at least 550 Pa, more preferably at least 650 Pa, even more preferably at least 700 Pa, yet more preferably at least 750 Pa, yet more preferably at least 900 Pa, most preferably at least 1200 Pa when said fibers are dispersed under a low shear stirring of preferably less than 5000 rpm, more preferably less than 3000 rpm.

The present invention also provides a method for manufacturing the inventive fibers, comprising the steps of:
  a. Providing an aqueous slurry of a source of citrus fibers, said slurry having a pH of between 2 and 9.
  b. Homogenizing the aqueous slurry of a source of citrus fibers to obtain an aqueous slurry of citrus fibers;
  c. Contacting the aqueous slurry of citrus fibers with an organic solvent to obtain a precipitate phase and a liquid phase; wherein the precipitate is in the form of granules;
  d. Separating said precipitate phase from the liquid phase to obtain a semi-dry citrus fiber cake having a dry substance-content of at least 10 wt % relative to the mass of said cake;
  e. Comminuting said cake to obtain grains containing citrus fibers; and optionally mixing said grains with an additive to obtain semi-dry citrus fibers optionally comprising the additive; and
  f. Desolventizing and/or dehydrating said semi-dry citrus fibers to obtain dry citrus fibers comprising the additive and having a moisture content of preferably below 20 wt % relative to the total weight of the fibers.

It is difficult to prepare dry citrus fibers without affecting their water binding characteristics and/or dispersibility in an aqueous media. This difficulty is attributed to many factors (collectively referred to in literature as "hornification") such as the formation of hydrogen bonds and/or lactone bridges between the fibers. Hornification typically reduces the available free-surface area of the fibers and/or strengthens the linkage between the fibers, which in turn may reduce the capacity of the fibers to absorb, bind and hold liquid and to disperse. Hornified dry citrus fibers either cannot be dispersed into an aqueous medium, e.g. water, a water solution or a water suspension, or they can be dispersed only by using high or ultra-high shear mixing. The method of the invention succeeded however in producing dry citrus fibers having excellent water binding characteristics and rheological properties.

The method of the invention (the inventive method), contains a step of homogenizing an aqueous slurry of a source of citrus fibers ("source slurry"). The terms "slurry" and "dispersion" mean the same within the context of the present invention and are used interchangeably herein. The source of citrus fibers may be citrus peel, citrus pulp, citrus rag or combinations thereof. The source of citrus fibers may be a by-product obtained during the pectin extraction process. Preferably, the source of the citrus fibers is citrus peel; more preferably is de-pectinized citrus peel. Said source slurry preferably comprises a dry substance content of at least 2 wt %, more preferably at least 3 wt %, more preferably at least 4 wt %. Preferably said dry substance content of said source slurry is at most 20 wt %, more preferably at most 15 wt %, even more preferably at most 10 wt %, yet even more preferably at most 8 wt %, most preferably at most 6 wt %.

The homogenization of the source slurry may be carried out with a number of possible methods including, but not limited to, high shear treatment, pressure homogenization, cavitation, explosion, pressure increase and pressure drop treatments, colloidal milling, intensive blending, extrusion, ultrasonic treatment, and combinations thereof.

In a preferred embodiment, the homogenization of the source slurry is a pressure homogenization treatment which may be carried out with a pressure homogenizer. Pressure homogenizers typically comprise a reciprocating plunger or piston-type pump together with a homogenizing valve assembly affixed to the discharge end of the homogenizer. Suitable pressure homogenizers include high pressure homogenizers manufactured by GEA Niro Soavi of Parma (Italy), such as the NS Series, or the homogenizers of the Gaulin and Rannie series manufactured by APV Corporation of Everett, Massachusetts (US). During the pressure homogenization, the source slurry is subjected to high shear rates as the result of cavitation and turbulence effects. These effects are created by the source slurry entering a homogenizing valve assembly which is part of a pump section of the homogenizer at a high pressure (and low velocity). Suitable pressures for the inventive method are from 50 bar to 2000 bar, more preferably between 100 bar and 1000 bar. While not being bound to any theory, it is believed that the homogenization causes disruptions of the source of citrus fibers and its disintegration into the fibrous component.

Depending on the particular pressure selected for the pressure homogenization, and the flow rate of the source slurry through the homogenizer, the source slurry may be homogenized by one pass through the homogenizer or by multiple passes. In one embodiment, the source slurry is homogenized by a single pass through the homogenizer. In a single pass homogenization, the pressure used is preferably from 300 bars to 1000 bars, more preferably from 400 bars to 900 bars, even more preferably from 500 bars to 800 bars. In another preferred embodiment, the source slurry is homogenized by multiple passes through the homogenizer, preferably at least 2 passes, more preferably at least 3 passes through the homogenizer. In a multi-pass homogenization, the pressure used is typically lower compared to a single-pass homogenization and preferably from 100 bars to 600 bars, more preferably from 200 bars to 500 bars, even more preferably from 300 bars to 400 bars.

The result of the homogenization step is an aqueous slurry of citrus fibers ("fibers slurry") comprising a dry substance content of fibers in essentially the same amount as the source slurry. Said fibers slurry is then contacted with an organic solvent. Said organic solvent should preferably be polar and water-miscible to better facilitate water removal. Examples of suitable organic solvents which are polar and water-miscible include, without limitation, alcohols such as methanol, ethanol, propanol, isopropanol and butanol. Ethanol and isopropanol are preferred organic solvents; isopropanol is the most preferred organic solvent for use in the inventive method. The organic solvent can be used in its 100% pure form or may be a mixture of organic solvents. The organic solvent can also be used as a mixture of the organic solvent and water, hereinafter referred to as an aqueous solvent solution. The concentration of organic solvent in said aqueous solvent solution is preferably from about 60 wt % to about 100 wt % relative to the total weight of said solution, more preferably between 70 wt % and 95 wt %, most preferably between 80 wt % and 90 wt %. In general, lower concentrations of the organic solvent are suitable to remove water and water-soluble components whereas increasing the concentration of said organic solvent also helps in removing oil and oil-soluble components if desired. In one embodiment, an organic solvent mixture containing a non-polar organic (NPO) co-solvent and the organic solvent or the aqueous solvent solution is used in the inventive method. The utilization of the organic solvent mixture may improve for example the recovery of oil-soluble components in the citrus pulp. Examples of suitable NPO co-solvents include, without limitation, ethyl acetate, methyl ethyl ketone, acetone, hexane, methyl isobutyl ketone and toluene. The NPO co-solvents are preferably added in amounts of up to 20% relative to the total amount of organic solvent mixture.

The fibers slurry is contacted with the organic solvent preferably in a ratio slurry:solvent of at most 1:8, more preferably at most 1:6, or most preferably at most 1:4. Preferably said ratio is at least 1:0.5, more preferably at least 1:1, most preferably at least 1:2. Preferably, said fibers slurry is contacted with the organic solvent for at least 10 minutes, more preferably for at least 20 minutes, most preferably for at least 30 minutes. Preferably, said slurry is contacted with the organic solvent for at most several hours, more preferably for at most 2 hours, most preferably for at most 1 hour.

According to the invention, said fibers slurry is contacted with said organic solvent to obtain a precipitate phase and a liquid phase. The inventors observed that during contacting the organic solvent with the fibers slurry, the fibers slurry releases at least part of its water content into the organic solvent which in turn causes the citrus fibers to precipitate. By "precipitate phase" is herein understood a phase containing the majority of the citrus fibers, e.g. more than 80% of the total amount of fibers, preferably more than 90%, most preferably more than 98% and also containing organic solvent and water. The precipitate phase usually settles due to gravity forces. The precipitate phase typically has a solid- or a gel-like appearance, i.e. it essentially maintains its shape when placed on a supporting surface. By "liquid phase" is herein understood a phase containing organic solvent and water. The liquid phase may also contain some citrus fibers which did not precipitate. According to the invention, the precipitate phase is in the form of granules, preferably, millimeter-size granules. Preferred granule sizes are between 1 mm and 100 mm, more preferably between 5 mm and 50 mm. By "the size of a granule" is herein understood the biggest dimension of said granule. The formation of the precipitate phase into granules may be achieved for example by bringing under agitation the fibers slurry into a container containing the organic solvent or by pouring said slurry in the organic solvent. The amount of agitation typically dictates the size of the formed granules. It was observed that by forming granules, the subsequent water removal from said granules is facilitated. Without being bound to any theory, it is believed that the formation of granules also aids in preserving and/or increasing the free surface area of the citrus fibers available for water binding and may also avoid a collapse of the fibers.

The precipitate phase is subsequently separated from the liquid phase to obtain a semi-dry citrus fibers cake ("fiber cake"). Said separation can be achieved using known methods such as centrifugation, filtration, evaporation and combinations thereof.

To increase the dry substance content, steps b) and c) of the inventive method can be repeated at least one time, preferably before carrying out step d). The fiber cake can also be subjected to an extraction step. A preferred extraction method is pressing, e.g. with a normal press, a screw press or an extruder. A more preferred extraction method is pressure filtration using a volume chamber filter press or a membrane filter press; pressure filters being sold for example by BHS Sonthofen, DE. Two-sided liquid removal is recommended for the pressure filtration since more filtering area is available per volume of the fiber cake.

The fiber cake is semi-dry, i.e. it has a dry substance content of preferably at least 10 wt %, more preferably of at least 15 wt %, or most preferably of at least 20 wt % relative to the mass of said cake. Preferably, said cake has a liquid-content of at most 50 wt %, more preferably at most 40 wt %, most preferably at most 30 wt % relative to the total mass of said cake. The liquid typically contains organic solvent and water.

In accordance with the invention, the fiber cake is comminuted to obtain grains containing citrus fibers ("fiber grains"), said grains preferably having a diameter of at most 100 mm, more preferably at most 50 mm, even more preferably at most 30 mm, yet even more preferably at most 10 mm, yet even more preferably at most 5 mm, most preferably at most 3 mm. With "grain diameter" is herein understood the largest dimension of the grain. The diameter may be determined using a microscope equipped with graticule. Cutters may be used to cut the fiber cake into grains. Alternatively, the fiber cake can subjected to milling and/or grinding in order to form it into grains. Examples of suitable means to comminute the fiber cake include without limitation a cutter mill, a hammer mill, a pin mill, a jet mill and the like.

The fiber grains are mixed with an additive to obtain semi-dry citrus fibers comprising the additive. Examples of suitable additives as well as preferred choices are given above and will not be repeated herein. Mixing the fiber grains with the additive can be effected with known means in the art, examples thereof including without limitation a malaxer, a transport screw, an air-stream agitation mixer, a paddle mixer, a Z-mixer, a tumble mixer, a high speed paddle mixer, a power blender and the like. The additive may be provided in a solid form or in solution. Preferably, the additive is provided in a solid form, more preferably as a powder, even more preferably as a powder having an average particle size ("APS") of between 100 and 500 μm, more preferably between 150 and 300 μm; the APS can be determined by ASTM C136-06.

The semi-dry citrus fibers are subjected to a desolventizing and/or dehydrating step wherein the organic solvent and/or the water are extracted from said semi-dry citrus fibers. Preferably, the inventive method contains both steps of desolventizing and dehydration. It was surprisingly observed that during the organic solvent and/or water extraction, the hornification of citrus fibers was largely prevented. Without being bound to any theory, the inventors attributed the reduced hornification to the careful pre-processing of the citrus fibers prior to said extraction as detailed in steps a) to d) of the inventive method.

Desolventisation and dehydration of said semi-dry citrus fibers can be carried out with a desolventizer which removes organic solvent and/or water from the fibers and may also enable the organic solvent to be reclaimed for future use. Desolventizing also ensures that the obtained dry citrus fibers are safe for milling and commercial use. The desolventizer can employ indirect heat to remove the organic solvent from the semi-dry citrus fibers; the advantage of using said indirect heat is that significant amounts of organic solvents can be extracted. Also, direct heat can be provided for drying, e.g. by providing hot air from flash dryers or fluidized bed dryers. Direct steam may be employed, if desired, to remove any trace amounts of organic solvent remaining in the fibers. Vapors from the desolventizer preferably are recovered and fed to a still to reclaim at least a portion of the organic solvent.

Retention times for the desolventizing and/or dehydrating step may vary over a wide range but can be about 5 minutes or less. Suitable temperatures at which said desolventizing and dehydrating step is carried out depend on such factors as the type of organic solvent and most often ranges from about 4° C. to about 85° C. at atmospheric pressure. Temperatures can be appropriately increased or decreased for operation under supra- or sub-atmospheric pressures. Optionally, techniques such as ultrasound are used for enhancing efficiency of the desolventizing and dehydrating. By maintaining a closed system, solvent losses can be minimized. Preferably, at least about 70 wt % of the organic solvent is recovered and reused.

Dehydration can be effected with known means in the art, examples thereof including without limitation paddle driers, fluidized bed driers, stirred vacuum driers, drum driers, plate driers, belt driers, microwave driers and the like. Preferably, the dehydration temperature is at most 100° C., more preferably at most 80° C., most preferably at most 60° C. Preferably, the dehydration temperature is at least 30° C., more preferably at least 40° C., most preferably at least 50° C.

The desolventizing and/or dehydrating step are carried out to obtain dry citrus fibers comprising the additive, said dry citrus fibers having a moisture content of at most 20 wt % relative to the total weight of the fibers with the additive, preferably at most 15 wt %, more preferably at most 12 wt %, even more preferably at most 10 wt %, most preferably at most 8 wt %.

Optionally, the method of the invention further comprises a step of removing said additive and/or classifying the dry citrus fibers with or without the additive to obtain the desired particle size and/or packing the dry citrus fibers.

In a preferred embodiment, the inventive method comprises a classification step of the dry citrus fibers which may improve the homogeneity of the powder, narrow particle size distribution and improve degree of rehydration. Classification may be carried out using either a static or dynamic classifier. The inventive method may further comprise a packaging step of the dry fibers.

In another preferred embodiment, the additive is extracted from the dried and/or classified citrus fibers as obtained at steps f) and/or g), respectively to obtain dry citrus fibers without the additive. To aid in the extraction of the additive, preferably, an additive is used that has a boiling point of less than the degradation temperature of the citrus fibers. The extraction may be performed by washing the additive with a suitable solvent other than water. The extraction is preferably performed by subjecting said dry citrus fibers comprising the additive to an extraction temperature between the boiling point of the additive and the degradation temperature of the citrus fibers and allowing the additive to evaporate; preferably the evaporation is carried out under vacuum. Preferably, said additive has a boiling point of at most 250° C., more preferably at most 200° C., most preferably at most 150° C. The boiling points of various materials are listed in the CRC Handbook of Chemistry and Physics or alternatively, ASTM DI 120 may be used to determine said boiling point. Preferably the extraction temperature is between 100 and 300° C., more preferably between 100 and 250° C., most preferably between 100 and 200° C. Examples of additives having such reduced boiling points include low molecular weight polyols, e.g. polyether polyols, ethylene glycols, and the like. By low molecular weight is herein understood an $M_w$ of between 50 and 500. The use of such extractable additives enables the manufacturing of the inventive fibers. Alternatively, dry citrus fibers without the additive may be obtained with the inventive method by skipping in step d) the addition of the additive by mixing. Dry cellulose fibers may also be obtained with the method of the invention by choosing an appropriate source of cellulose fibers to be processed.

The dry citrus fibers comprising the additive are preferably milled and/or classified to obtain a powder having an average particle size of preferably at least 50 μm, more preferably at least 150 μm, most preferably at least 250 μm. Preferably said average particle size is at most 2000 μm, more preferably at most 1000 μm, most preferably at most 500 μm. Said average particle size may be determined by ASTM C136-06.

In a seventeenth aspect, the invention relates to citrus fibers in dry form obtainable by the method of the present invention.

It was observed that the inventive fibers have optimal water binding characteristics and/or rheological properties. These properties may lead to optimal quality of various products containing thereof, e.g., food, feed, personal care and pharmaceutical products.

The inventive fibers are suitably used in the production of a large variety of food compositions. Examples of food compositions comprising thereof, to which the invention relates, include: luxury drinks, such as coffee, black tea, powdered green tea, cocoa, adzuki-bean soup, juice, soya-bean juice, etc.; milk component-containing drinks, such as raw milk, processed milk, lactic acid beverages, etc.; a variety of drinks including nutrition-enriched drinks, such as calcium-fortified drinks and the like and dietary fiber-containing drinks, etc.; dairy products, such as butter, cheese, yogurt, coffee whitener, whipping cream, custard cream, custard pudding, etc.; iced products such as ice cream, soft cream, lacto-ice, ice milk, sherbet, frozen yogurt, etc.; processed fat food products, such as mayonnaise, margarine, spread, shortening, etc.; soups; stews; seasonings such as sauce, TARE, (seasoning sauce), dressings, etc.; a variety of paste condiments represented by kneaded mustard; a variety of fillings typified by jam and flour paste; a variety or gel or paste-like food products including red bean-jam, jelly, and foods for swallowing impaired people; food products containing cereals as the main component, such as bread, noodles, pasta, pizza pie, corn flake, etc.; Japanese, US and European cakes, such as candy, cookie, biscuit, hot cake, chocolate, rice cake, etc.; kneaded marine products represented by a boiled fish cake, a fish cake, etc.; live-stock products represented by ham, sausage, hamburger steak, etc.; daily dishes such as cream croquette, paste for Chinese foods, gratin, dumpling, etc.; foods of delicate flavor, such as salted fish guts, a vegetable pickled in sake lee, etc.; liquid diets such as tube feeding liquid food, etc.; supplements; and pet foods. These food products are all encompassed within the present invention, regardless of any difference in their forms and processing operation at the time of preparation, as seen in retort foods, frozen foods, microwave foods, etc.

Methods of Measurement

Sample Preparation: Prior to any characterization, all citrus fibers made in accordance with the Examples and Comparative Experiments presented herein below, were milled using a Waring 8010EG laboratory blender (Waring Commercial, USA) equipped with a SS110 Pulverizer Stainless Steel Container using its low speed setting (18000 rpm) for 3 to 5 sec. The milled samples were sieved using a AS200 digital shaker from Retsch GmbH Germany with a sieve set of 10 mm, 500 μm, 250 μm and 50 μm sieves (50×200 mm), sieving conditions: 1 min at amplitude setting 60. Particles larger than 500 μm were milled again until they passed sieve 500 μm.

pH can be measured using any pH-meter known in the art, preferably having an accuracy of 0.1 units. Metler-Toledo; Omega; Hanna Instruments are for example providing such pH-meters.

Moisture content ("MC"): The moisture content was determined by weighing a milled sample placed in a pre-dried vessel and subsequently heating the vessel containing the sample overnight in an oven at 105° C. The moisture content (in wt %) was calculated as (A1−A2)/A1×100 where A1 was the weight of the sample before drying in the oven and A2 was the weight of the resulted dried sample.

Dry substance content ("DS") is measured according to formula:

DS (%)=100%−MC (%)

Rheology measurements

Sample preparation for rheology measurements: a dispersion was made by rehydrating in a buffer solution the milled and sieved samples to achieve a 2.0 wt % fiber concentration. The buffer solution was obtained by dissolving 40.824 grams of $KH_2PO_4$ in 2500 g of demineralized water using a magnetic stir bar. The pH of the buffer solution was raised to 7.0 by adding drops of 5M NaOH solution, after which demineralized water was added to obtain a total of 3000 gram of buffer solution. The dispersion was prepared by weighing the appropriate amount of sample (correcting for moisture and if applicable additive content) in 500 mL plastic pots followed by addition of buffer solution to a total weight of 300 g and mixing by mild stirring using a spoon. Care was taken to prevent lump formation. Subsequently, the dispersion was mixed with a Silverson L4RT overhead batch mixer equipped with an Emulsor Screen (with round holes of 1 mm diameter) for 30 seconds at 750 rpm followed by 10 minutes at 500 rpm.

Measurements of G', Yield Stress and kinematic viscosity: the measurements were performed using an ARG2 rheometer from TA Instruments Ltd UK equipped with sand-blasted stainless steel parallel plates of 40 mm diameter and operated at a temperature of 20° C. using a measurement gap of 1.000 mm. To ensure that measurements are carried out on representative samples, the samples were gently stirred using a teaspoon just before placing an aliquot of the sample in the rheometer. The rheological analysis was carried out using a standard protocol including a time sweep, continuous ramps (up and down) of the shear rate and a strain sweep with the following settings:

Time sweep: delay 10 s, 5 min 0.1% strain at 1 Hz;

Continuous ramp step1: 0.1 to 500 $s^{-1}$ shear rate duration 2 min; mode: log sampling: 10 point/decade;

Continuous ramp step2: 500 to 0.1 $s^{-1}$ shear rate duration 2 min; mode: log sampling: 10 point/decade;

Strain sweep: Sweep: 0.1 to 500% Strain at 1 Hz, duration 2 min; mode: log sampling: 10 point/decade.

The data analysis software package form TA Instruments allowed extracting the storage modulus G', the kinematic viscosity and the yield stress (YS). G' is reported at the time of 300 seconds. The kinematic viscosity is reported at a shear rate of 22 $s^{-1}$ (shear rate down curve). The YS is determined from the maximum in the graph of G' versus strain %, and is defined as YS=G'×strain. The characterization of the citrus fibers of the Examples and Comparative Experiments in terms of G', viscosity and YS, are summarised in Tables 2 and 3.

Swelline volume (SV) was determined as follows: 100 mL of a dispersion having 0.1 wt % fiber content was prepared by rehydrating in a Clark-Lubs buffer solution (pH 6.9; 0.1M potassium phosphate monobasic anhydrous $KH_2PO_4$ (13.61 g/L) in RO water) the milled and sieved samples. The dispersion had 0.2 wt % fiber concentrations relative to its total mass. The dispersion was prepared by weighing the appropriate amount of sample (correcting for moisture and if applicable additive content) in 500 mL plastic pots followed by addition of buffer solution to a total weight of 300 g. The sample was mixed with the buffer solution by stirring with a magnetic stirrer during 30 minutes at 500 rpm. The dispersion was carefully poured to avoid air entrapping into a 100 mL graded glass measuring cylinder (Brand; ±0.75 mL at 20° C., 2.5 cm internal diameter) while keeping the cylinder slightly tilted. The top of the cylinder was closed using para-film. The closed cylinder was slowly shaken by tilting it ten times to mix and to remove any air bubbles that might be trapped in the dispersion. The cylinder was stored at room temperature in a vibration-free place and the fibers were allowed to settle under gravity. After 24 hours, SV was determined by measuring the volume occupied by the fibers as determined by optical inspection and expressing it as a percentage from the total volume. The higher the volume, the higher and thus better the SV of the sample.

Water Holding Capacity (WHC) and its variation with the G-force was determined as follows: a slurry of citrus fibers was made in a Clark-Lubs buffer solution (pH 6.9; 0.1M potassium phosphate monobasic anhydrous $KH_2PO_4$ (13.61 g/L) in RO water) by dispersing the fibers in said solution by means of a magnetic stirrer (30 min) at 400 rpm. The slurry contained 2 wt % citrus fibers (relative to the total weight of the slurry). The slurry was diluted down under stirring (30 min; 400 rpm) with the same buffer solution to reach a diluted slurry having 1 wt % citrus fibers. 100 grams of the diluted slurry (containing 1 gram of fibers) was transferred to a 50 mL self-standing polypropylene centrifuge tubes with plug seal cap (Corning 430897, Corning Inc.) which were previously weighted to determine their mass ($W_0$) when empty. The tubes with the slurry were weighted again ($W_1$) and were centrifuged at different G-forces up to 4000 G for 10 minutes with a Centrifuge Labofuge 400 Heraeus. The amount of G-force applied on the sample was indicated by the centrifuge. After removing the supernatant (e.g. with a pipette), the weight ($W_2$) of the supernatant and of the tubes ($W_3$) was determined. WHC (in %) was determined according to formula: WHC=$(W_3-W_0)/(W_1-W_0)\times 100$. To determine the DF of the WHC with the G-force, the SV in Formula 1 was measured following the SV determination procedure described above with the difference that the concentration of the fibers in the dispersion was 1 wt %.

Viscosity ratio measurements indicating the ability of a fiber sample to develop its functionality on low shearing were made as follows: dispersions were prepared as presented above in the "Rheology measurements" section. A first viscosity was measured on the dispersions following the methodology presented in the "Rheology measurements". Subsequently, the dispersions were passed through a homogenizer at 250 bars and allowed to rest for about 1 hour at 20° C. to reach their equilibrium state. A second viscosity was measured under the same conditions as previously presented. The ratio of the first viscosity to the second viscosity is used as an indicator of the sample's capacity to reach functionality after low shear dispersion.

The invention will now be described with the help of the following examples and comparative experiments, without being however limited thereto.

Example 1

Dry citrus fibers were manufactured as follows:
Step (1) Water was added to de-pectinized citrus peel (a by-product of a pectin extraction process) to obtain an aqueous slurry having a dry substance content of about 4 wt % and the slurry's pH was adjusted to between 2 and 9. The slurry was one time charged to a pressure homogenizer (APV homogenizer, Rannie 15-20.56) at 600 bars. An aqueous slurry containing citrus fibers was obtained.
Step (2) A precipitation tank was filled with an aqueous isopropanol solution (about 82 wt % isopropanol in water). The aqueous slurry containing citrus fibers was brought under agitation into the precipitation tank by using a volumetric pump and a precipitate in the form of granules having sizes between 5 mm and 50 mm was formed in the tank. The slurry:isopropanol ratio was 1:2. Agitation by stirring was provided while bringing said slurry into the tank and the precipitate was kept in the tank for about 30 minutes.
Step (3) The precipitate was charged to a centrifuge decanter (Flottweg centrifuge) operated at above 4000 rpm, to separate the liquid phase (i.e. water and isopropanol) from the citrus fibers.
Step (4) Steps (2) and (3) were repeated and the precipitate was subjected to an extraction step to increase the dry substance content. The extraction step was carried out by feeding the precipitate to a screw press. The speed and pressure of the press were adjusted to obtain a semi-dry cake having a dry substance content of about 22 wt %.
Step (5) The semi-dry cake was comminuted using a Lodige type FM 300 DMZ mixer, for about 15 to 30 minutes, to obtain grains having sizes in the range of 1 millimeter.
Step (6) The comminuted cake was dried in a ventilated oven at 40° C. for about 2 hours to reach a moisture content of about 8 wt %.
The properties of the obtained fibers are presented in Tables 1 and 2.

Examples 2 to 11

Dry citrus fibers were manufactured as follows: Example 1 was repeated with the difference that at step (5) the comminuted semi-dry cake was mixed with various additives at various ratios as indicated in Table 1. The properties of the fibers are presented in Tables 1 and 2.

Comparative Experiment 1 and Commercial Samples 1 to 3

Dry citrus fibers were manufactured as follows:
Step (1) Water was added to de-pectinized citrus peel to obtain an aqueous slurry having a dry substance content of about 4 wt %. The slurry was charged to a pressure homogenizer (APV homogenizer, Rannie 15-20.56) at 600 bars. An aqueous slurry containing citrus fibers was obtained.
Step (2) The aqueous slurry containing citrus fibers was subjected to an extraction step with a screw press to increase the dry substance content to a level of about 22% wt %.
Step (5) The semi-dry cake was dried on an plate in an oven at 40° C. for several days to reach a moisture content of about 8 wt %.
Various commercial samples (CS.1 to CS.3) were also investigated The properties of the obtained fibers and those of the commercial samples are presented in Tables 1 and 2.
WHC, SV and G'

TABLE 1

|  | Additive | Amount additive (%) | WHC at 3000G (mL/g) | SV (%) | G' (Pa) |
|---|---|---|---|---|---|
| Ex. 1 | — | — | 36.05 | 51,75 | 654 |
| Ex. 2 | maltodextrin | 10 | 36.47 | 51.00 | 656 |
| Ex. 3 |  | 20 | 38.80 | 44.75 | 902 |
| Ex. 4 |  | 50 | 41.91 | 48.00 | 1439 |
| Ex. 5 | glycerol | 10 | 35.78 | 50.00 | 684 |
| Ex. 6 |  | 20 | 41.94 | 52.00 | 747 |
| Ex. 7 |  | 50 | 46.73 | 54.75 | 999 |
| Ex. 8 | sorbitol | 10 | 38.76 | 53.50 | 689 |
| Ex. 9 |  | 20 | 37.51 | 53.75 | 749 |
| Ex. 10 |  | 50 | 41.53 | 53.75 | 754 |

TABLE 1-continued

| | Additive | Amount additive (%) | WHC at 3000G (mL/g) | SV (%) | G' (Pa) |
|---|---|---|---|---|---|
| Ex. 11 | gelatin | 10 | 36.78 | 52.75 | 582 |
| CE.1 | | | | | 0.11 |
| CS.1 | — | — | 18.98 | | |
| CS.2 | sugar | 7.36 | 10.68 | | |
| CS.3 | sugar | 5.38 | 15.83 | | |

WHC at Various G Forces

To determine how WHC varies with the G-force, the method described above in the METHODS OF MEASUREMENT section was used. Data is reported in Table 2. The data was fitted using Formula 1 and the DF was identified.

TABLE 2

| | WHC | | | | |
|---|---|---|---|---|---|
| | 500G | 1000G | 2000G | 3000G | DF |
| Ex. 1 | 94.60 | 78.85 | 30.33 | 21.94 | 900 |
| Ex. 7 | 99.00 | 94.15 | 71.3 | 52.78 | 2400 |
| Ex. 9 | 99.00 | 96.05 | 76.36 | 56.92 | 2650 |
| Ex. 12 | 99.00 | 91.81 | 62.34 | 41.94 | 1800 |
| CS.1 | 13.51 | 12.22 | 11.23 | 10.68 | 100 |
| CS.2 | 99.00 | 23.83 | 17.92 | 15.83 | 350 |
| CS.3 | 51.22 | 31.83 | 24.36 | 18.98 | 400 |

The invention claimed is:

1. A method for preparing a composition comprising citrus fibers, the method comprising:
   a. providing an aqueous slurry of a source of citrus fibers, said slurry having a pH of between 2 and 9;
   b. homogenizing the aqueous slurry of a source of citrus fibers to obtain an aqueous slurry of citrus fibers;
   c. contacting the aqueous slurry of citrus fibers with an organic solvent to obtain a precipitate phase and a liquid phase; wherein the precipitate is in the form of granules;
   d. separating said precipitate phase from the liquid phase to obtain a semi-dry citrus fiber cake having a dry substance-content of at least 10 wt % relative to the mass of said cake;
   e. comminuting said cake to obtain grains containing citrus fibers; and mixing said grains with an additive to obtain semi-dry citrus fibers comprising the additive; and
   f. desolventizing and/or dehydrating said semi-dry citrus fibers to obtain dry citrus fibers having a moisture content of below 20 wt % relative to the total weight of the dry citrus fibers;
   wherein:
      the source of citrus fibers are de-pectinized citrus peel in dry form;
      the dry citrus fibers comprise:
         the additive in an amount that is 5 wt % to 50 wt % of the dry citrus fibers relative to a weight of the dry citrus fibers without water, the additive selected from the group consisting of sugar, a polysaccharide, a polyol, and a combination thereof;
         a water holding capacity (WHC) of at least 35 mL of water per gram of anhydrous (0% moisture) fibers;
         a storage modulus (G') of at least 400 Pa when measured on an aqueous medium comprising an amount of 2 wt % citrus fibers dispersed therein under a low-shear stirring of less than 10000 rpm; and
         a swelling factor (SV), wherein applying a gravitational force (G-force) on an aqueous medium comprising 1 wt % of said dry citrus fibers dispersed therein the WHC varies with the G-force according to Formula 1:

$$WHC > SV - e^{\frac{1}{DFG-force}} \qquad \text{Formula 1}$$

wherein DF is a decay factor of at least 500.

2. A food composition comprising citrus fibers, wherein said food composition is chosen from the group consisting of luxury drinks, milk component-containing drinks, nutrition-enriched drinks, dairy products, iced products, processed fat food products, soups, stews, seasonings, paste condiments, fillings, gels, paste-like food products, food products containing cereals as the main component, cakes, kneaded marine products, live-stock products, daily dishes, foods of delicate flavor, liquid diets, supplements and pet foods;
   wherein dry citrus fibers comprise an additive in an amount that is 5 wt % to 50 wt % of the dry citrus fibers relative to a weight of the dry citrus fibers without water, the additive selected from the group consisting of sugar, a polysaccharide, a polyol, and a combination thereof, and
   wherein the dry citrus fibers have:
      a water holding capacity (WHC) of at least 35 mL of water per gram of anhydrous (0% moisture) fibers;
      a storage modulus (G') of at least 400 Pa when measured on an aqueous medium comprising an amount of 2 wt % citrus fibers dispersed therein under a low-shear stirring of less than 10000 rpm; and
      a swelling factor (SV), wherein applying a gravitational force (G-force) on an aqueous medium comprising 1 wt % of said dry citrus fibers dispersed therein the WHC varies with the G-force according to Formula 1:

$$WHC > SV - e^{\frac{1}{DFG-force}}, \qquad \text{Formula 1}$$

wherein DF is a decay factor of at least 500.

3. The method of claim 1, wherein the aqueous slurry of the source of citrus fibers comprises a dry substance content of at least 2 wt %.

4. The method of claim 1, wherein the homogenization in step (b) is a pressure homogenization treatment.

5. The method of claim 1, wherein the organic solvent in step (c) is chosen from the group of solvents consisting of methanol, ethanol, propanol, isopropanol and butanol.

6. The method of claim 1, wherein the slurry in step (c) is contacted with the organic solvent in a ratio of at most 1:8.

7. The method of claim 1, wherein the precipitate granules have a size between 1 mm and 100 mm.

8. The method of claim 1, wherein the precipitate phase is separated from the liquid phase by means of centrifugation, filtration, evaporation or combinations thereof.

9. The method of claim 1, wherein the cake in step (e) is comminuted to obtain grains having a diameter of at most 100 mm.

10. The method of claim 1, wherein the desolventizing and/or dehydrating step is carried out at a temperature from 4° C. to 85° C.

11. The method of claim 1 further comprising a classification step.

12. The method of claim 1, wherein the dry citrus fibers comprise a moisture content relative to the total weight of the dry citrus fibers of at most 12 wt %.

13. The method of claim 1, wherein the DF is at least 750.

14. The method of claim 1, wherein the WHC is at least 40 mL of water per gram of anhydrous (0% moisture) fibers, the WHC being determined on an aqueous medium comprising 1 wt % (relative to the total weight of said medium) of said dry citrus fibers dispersed therein after subjecting said medium to a G-force of 3000 G.

15. The method of claim 1, wherein the additive:fiber ratio of the dry citrus fibers is in a range of from 0.1:1.00 to 10.00:1.00.

16. The method of claim 1, wherein the additive is selected from the group consisting of maltodextrin, glycerol, sorbitol, and a mixture thereof.

17. The method of claim 1, wherein the swelling factor of the dry citrus fibers is in a range of from about 40% to about 55%.

18. The method of claim 1, wherein the additive is a powder having an average particle size in a range of from 100 μm to 500 μm.

19. The method of claim 1, wherein the additive is a polysaccharide and wherein the polysaccharide comprises dextrin.

20. A method for preparing a composition comprising citrus fibers, comprising:

preparing an aqueous slurry by mixing de-pectinized citrus peel with water;

homogenizing the aqueous slurry;

contacting the homogenized aqueous slurry with an organic solvent to obtain a precipitate phase and a liquid phase, the precipitate being in the form of granules;

separating the precipitate phase from the liquid phase to obtain a semi-dry citrus fiber cake;

comminuting the semi-dry citrus fiber cake to obtain grains containing citrus fibers; and mixing the grains with an additive in an amount of 5 wt % to 50 wt % on a dry weight basis to obtain semi-dry citrus fibers comprising the additive, the additive comprising a sugar, a polysaccharide, a polyol, or a combination thereof, and desolventizing and/or dehydrating said semi-dry citrus fibers to obtain dry citrus fibers;

the dry citrus fibers having:

a storage modulus (G') of at least 400 Pa when measured on an aqueous medium comprising an amount of 2 wt % citrus fibers dispersed therein under a low-shear stirring of less than 10000 rpm; and a swelling factor (SV), wherein applying a gravitational force (G-force) on an aqueous medium comprising 1 wt % of said dry citrus fibers dispersed therein the WHC varies with the G-force according to Formula 1:

$$WHC > SV - e^{\frac{1}{DFG-force}}, \quad \text{Formula 1}$$

wherein DF is a decay factor of at least 500.

* * * * *